_2,997,493_
METHOD FOR PREPARING STRAIGHT CHAIN HEXITOL FATTY ESTERS
Wilson F. Huber, State College, Pa., assignor to The Procter & Gamble Company, Cincinnati, Ohio, a corporation of Ohio
Filed Sept. 29, 1959, Ser. No. 843,178
18 Claims. (Cl. 260—410.6)

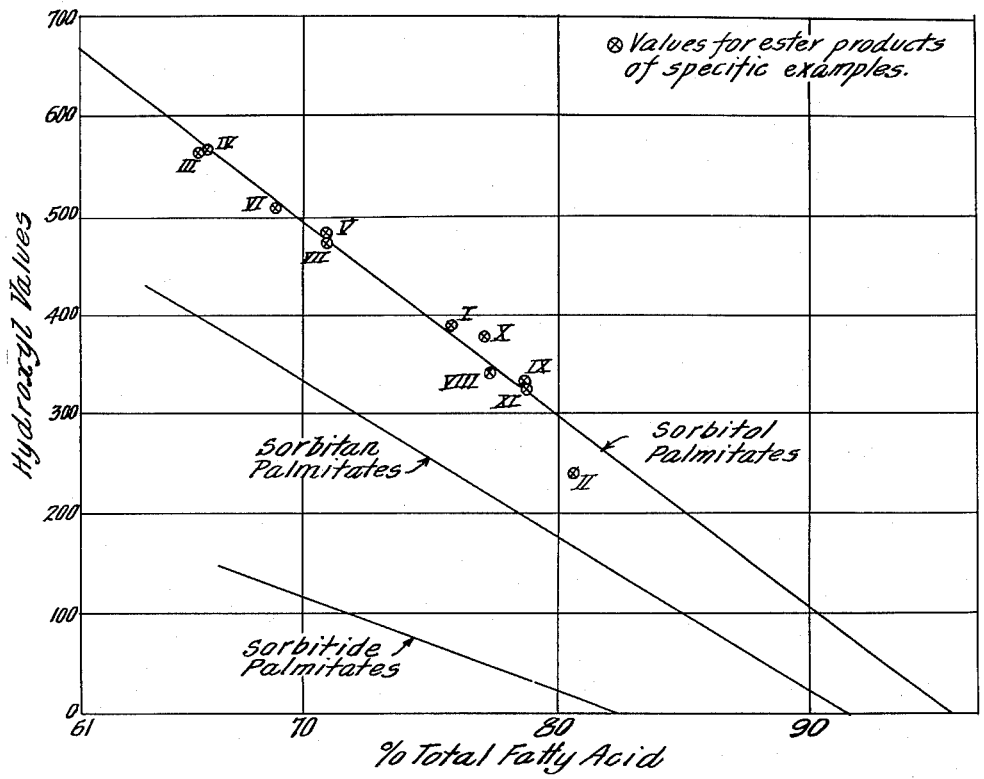

This invention relates to a process for preparing fatty esters of polyhydric alcohols.

More specifically, this invention relates to the preparation of partial and complete fatty esters of polyhydric alcohols having six carbon atoms in linear molecular configuration, such as sorbitol and mannitol.

As a matter of convenience, the following discussion for the most part treats with sorbitol and mannitol and the derivatives thereof. It is to be understood, however, that the discussion is equally applicable in the case of all of the polyhydric alcohols (straight-chain hexitols) contemplated herein.

Many methods of preparing fatty esters of polyhydric alcohols are known and have been heretofore employed. Among these are: The direct esterification of the polyhydric alcohols with fatty acids; reaction of the polyhydric alcohols with fatty acid anhydrides; and the reaction of polyhydric alcohols with the fatty acid halides. Various disadvantages are identified with these previous processes, such as difficulties in separating the desired products from the reaction mixture, excessive temperatures necessary to promote the reaction with the attendant adverse effects upon the organic reactants, including thermal decomposition, charring, discoloration and the like. Most particularly, such processes promote the dehydration of the polyhydric alcohol molecule to the anhydro or inner ether form.

The prior art identifies the products produced in accordance with the aforementioned process as, for example, sorbitol and mannitol esters. However, the products of these processes are not in fact the true sorbitol or mannitol esters but are more correctly identified as sorbitan and mannitan esters, the "an" ending indicating the presence of the anhydro configuration in the ester molecule.

The partial fatty esters of the hexitols, the preparation of which is contemplated in this application, are readily applicable where emulsification problems require solution. For example, these esters may be utilized in insecticides, textiles and industrial emulsions, dry-cleaning products and as constituents in detergent compositions. These esters are particularly applicable as emulsifiers in the preparation and formulation of various cosmetic and edible products, e.g. plastic shortenings, because of their non-toxic character. For example, they may be used in the preparation of cakes, candy, chewing gum, licorice, peanut butter, various beverages, pharmaceutical products and vitamin oils. They may also serve as crystallization modifiers or inhibitors in salad oils. Although the sorbitan- and mannitan-type esters, i.e. those esters containing anhydro groups, very probably have satisfactory emulsification powers, such esters, identified as they are with surface active agents, have not received Food and Drug Administration approval for use with edible products— the additive effect of a multiplicity of such agents which find their way into food products creating serious doubt that they are suitable for such use. (See 17 Fed. Register 4453, No. 97 and Fed. Register March 26, 1958, page 2007.) Consequently, the preparation of partial esters of straight-chain hexitols having substantially no anhydro groups present in the molecule is of considerable commercial significance. However, the formation of the true partial esters of sorbitol and mannitol, i.e., those esters containing no anhydro groups, has been accomplished prior to the present invention, only through the process described and claimed in the co-pending application of James B. Martin, Serial No. 793,820, entitled Method for Preparing Fatty Esters, filed February 17, 1959, or through the use of cumbersome and commercially impractical methods.

Although the prime consideration of this invention is the provision of a method for preparing partial fatty esters of straight-chain hexitols which are substantially free of anhydro groups, it is to be appreciated that the process disclosed and claimed herein can also be utilized for preparing complete fatty esters of the hexitols.

With the foregoing considerations in mind, it is an object of the present invention to provide a method whereby fatty esters of straight-chain hexitols can be prepared under reaction conditions which will not promote the formation of anhydro configurations in the ester molecule.

A further object of this invention is to provide a process for the preparation of fatty esters of straight-chain hexitols substantially free from molecular anhydro configurations which is commercially practical.

Other objects and advantages will be apparent from the following detailed descriptions taken in connection with the accompanying drawing in which single FIGURE I is a graph showing substantial conformity between calculated and observed values for products obtained by the practice of the invention.

It has been found that the foregoing objects can be accomplished by subjecting to interesterification a mixture of a straight-chain hexitol and a fatty acid ester of an aliphatic primary monohydroxy alcohol or a completely or incompletely esterfied fatty acid ester of a polyhydric alcohol having from 2 to 6 hydroxyl groups in the presence of a solvent selected from the group consisting of (1) sulfoxides of the general formula:

where R and R' are alkyl groups having from 1 to 3 carbon atoms and (2) amides of the general formula:

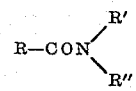

where R and R' are selected from the group consisting of hydrogen and an alkyl group having from 1 to 4 carbon atoms and R" is an alkyl group having from 1 to 4 carbon atoms, the total number of carbon atoms in R, R' and R" being not greater than 7.

Generally speaking, the invention contemplates reacting the straight-chain hexitol with the fatty acid ester in the presence of an alkaline catalyst which shows activity in interesterification reactions at a temperature in the range from about 50° C. to about 150° C. and in the presence of a solvent as described hereinbefore. Following completion of the interesterification of the components to the desired degree, the catalyst is inactivated by the addition of water and/or acids such as acetic, phosphoric, citric, hydrochloric and the like, and the desired reaction products are freed of solvent and purified by any suitable means.

The term "straight-chain hexitol" as used herein refers to those polyhydric alcohols having 6 carbon atoms in linear molecular configuration. Examples of the hexitols contemplated are sorbitol, mannitol, dulcitol, iditol, talitol and allitol.

The fatty esters which can be employed in the reaction, when an amide-type solvent is used as the reaction medium, are the fatty acid esters of primary aliphatic monohydroxy alcohols having from 1 to about 16 carbon atoms, for example, methanol, ethanol, hexanol, octanol, dodecanol, and hexadecanol, specific examples being methyl palmitate, dodecyl palmitate and hexadecyl palmitate. When, however, a sulfoxide-type solvent is used as the reaction medium only the esters of aliphatic primary monohydroxy alcohols containing from 1 to about 8 carbon atoms can be utilized as the fatty reactants.

In addition, fatty acid esters of completely or incompletely esterified polyhydric alcohols, having from 2 to 6 hydroxyl groups such as glycol, glycerol, erythritol and pentaerythritol can be employed. Glycol dipalmitate, glycerol mono-, di- and tri-palmitate, erythritol tetrapalmitate and pentaerythritol tetrapalmitate are examples of such fatty esters. The use of fatty esters of the straight-chain hexitols is also contemplated. For example, the reaction of sorbitol hexapalmitate with sorbitol can be carried out in accordance with the present invention in order to obtain partial fatty acid esters of sorbitol.

The length of the fatty acid chain of the esters which can be employed in the reaction of this invention is not critical and is dictated primarily by the type of fatty acid material source available. As a general proposition, however, it has been found that fatty acids containing from about 8 to about 22 carbon atoms in the alkyl chain are most useful. Therefore, the mixtures of fatty acids obtained from animal, vegetable and marine oils and fats, such as coconut oil, cottonseed oil, soybean oil, tallow, lard, herring oil, sardine oil and the like represent readily available sources of fatty acid radicals. In the event it is desired to produce straight-chain hexitol esters of single fatty acids by this invention, then the individual fatty acid esters of the relatively volatile alcohols (e.g. methanol and ethanol), having from about 12 to about 22 carbon atoms in the fatty acyl chain can be advantageously reacted with the polyhydric alcohol with the aid of the particular reaction media herein disclosed.

Of the fatty acid esters which can be used in the practice of this invention the esters of those alcohols having not more than 3 carbon atoms are preferred. In this group the fatty glycerides are particularly advantageous.

The choice of solvent is essential to the realization of the interesterification of the straight-chain hexitol and the fatty ester under the conditions hereinbefore set forth. It has been found that sulfoxides and amides responding to the foregoing definitions are eminently suitable as solvent reaction media in the present process.

The proportion of solvent which is used as the reaction medium is not critical and the reaction is successfully carried out so long as there is sufficient solvent present to dissolve the straight-chain hexitols. Normally, the amount of solvent can be varied from 0.2 to 50 times by weight of the straight-chain hexitol which is employed for reaction with the fatty acid ester. It is also to be understood that the solvent usage can be adjusted according to the particular reactants which are to be interesterified, precautions being taken, however, to assure a homogeneous system during the interesterification reaction.

The proportion of reactants is also not critical and is dictated primarily by the ultimate product which is desired. For example, in the reaction of sorbitol with a fatty ester, the proportion of these reactants can be chosen so that from one to essentially all of the hydrogen atoms of the hydroxyl groups of the sorbitol can be replaced by fatty acyl radicals. Or, where sorbitol and a triglyceride are being reacted, proportions can be chosen so that the final product may predominate in either glycerides or in sorbitol esters. As a practical matter, however, it has been found that molar ratios of straight-chain hexitol to fatty esters in the range from about 3:1 to 1:6 are most satisfactory, the proportions of the reactants being variable within the range depending upon the completeness of replacement desired and upon the number of fatty acid radicals in each mole of ester substance.

Although the process of the invention is illustrated herein with the use of sodium methoxide as the catalyst, effective practice of the process is not dependent upon the use of any particular catalyst. Rather, any alkaline molecular rearrangement or interesterification catalyst which will promote the interchange of radicals among the reactants of the process is suitable. Examples of usable catalysts are: sodium methoxide, sodium hydroxide, metallic sodium, sodium potassium alloy and quaternary ammonium bases such as trimethyl benzyl ammonium hydroxide. A discussion of other catalysts which are active in interesterification reactions may be found in U.S. Letters Patent 2,442,532 to E. W. Eckey, column 24, line 18 et seq.

The sodium methoxide catalyst may be advantageously used in the present invention in amounts from about 0.1 to about 2.0% by weight of the fatty ester which is to be reacted with the straight-chain hexitol. Equivalent amounts of other catalysts are, of course, also usable. The choice of catalyst and the amount which is to be used are dependent upon the particular constituents which are to be reacted.

In the practice of this invention, it was observed that the reaction rate for a given solvent usage and a given catalyst increased with an increase in temperature. With optimum amounts of solvent and sodium methoxide as the catalyst at a temperature of about 100° C. it was found that equilibrium was reached in about 1 to 5 minutes time. Where lower temperatures, such as 50° C., are employed a longer time is necessary to achieve desired ester formation. Temperatures above 100° C. and up to about 150° C. can be employed as desired. Generally speaking, with any of the foregoing reactants or catalysts and within the ranges of proportions set forth the process of the invention is preferably carried out at temperatures in the range from about 90° C. to 115° C.

Although the process of this invention is normally carried out at atmospheric pressure it can be carried out at reduced pressure, an operation which at times is decidedly advantageous. For example, when a fatty acid ester of methanol is reacted with sorbitol in a process employing dimethylacetamide or dimethylsulfoxide as the solvent reaction medium, operation under reduced pressure such as about 100 to 300 mm. of mercury enables the methanol formed as a result of the interesterification to be removed from the reaction zone substantially as rapidly as it is liberated. This promotes a substantially complete conversion of the methyl ester to soribtol fatty ester.

Under the foregoing conditions it has been found that the interesterification reaction may reach equilibrium in from about as little as 10 up to about 90 minutes, the reaction being accelerated by an increase in the amount of catalyst used or an increase in temperature. No adverse effects have been noted if the reactants are allowed to remain in contact under interesterification conditions for considerable lengths of time, e.g. several hours, after the interesterification reaction is substantially complete. From a practical standpoint, however, little advantage is gained from such practice.

Since the reaction of the present invention is an interesterification in which sorbitol, for example, is reacted with a fatty ester, the resulting product of the reaction will constitute an equilibrium mixture of sorbitol, esters thereof, displaced alcoholic substance from the ester originally employed, and ester of such alcoholic substance. Thus, if triglycerides are reacted with the sorbitol then the product of the reaction will contain mono- and diglycerides as well as sorbitol esters. If it is desired to obtain sorbitol esters which are not so contaminated with original esters and derivatives thereof, then it is preferable to react volatile alcohol esters such as methyl or ethyl esters with the sorbitol and to conduct the reaction under reduced pressure so that displaced alcohol is distilled off. Yields of sorbitol esters of high purity are obtainable in this way since unreacted volatile esters can be separated subsequently by distillation or crystallization procedures.

The following examples will illustrate the manner in which the invention can be practiced but it is to be understood that the specific conditions set forth in these examples are not to be considered limiting of the invention which is defined only by the scope of the appended claims. In the examples all parts are expressed by weight.

*Example I*

18 parts of mannitol, 162 parts of methyl palmitate and about 180 parts of dimethylacetamide were introduced into a reaction vessel provided with mechanical stirring means. This mixture was heated to about 100° C. and then a 10% suspension of sodium methoxide catalyst in xylene was added to the heated mixture in an amount equal to about 10% by weight of the methyl palmitate. The resulting mixture was allowed to react, with agitation, for ½ hour at 100° C. and at atmospheric pressure. The catalyst was then inactivated by the addition of about 10 parts of a 50% aqueous solution of acetic acid.

The reaction product was taken up in a 1:4 mixture of butanol and ethyl acetate and was water-washed three times with hot water. The butanol-ethyl acetate mixture was then removed from the product by evaporation under vacuum and the residue was steam deodorized at a temperature of from 130° to 150° C. and at a pressure of 1 mm. of mercury for one hour.

The ester product was found, upon analysis, to have a total fatty acid content of 75.8% and a hydroxyl value of 387.2. This product can be effectively used as an adjuvant in plastic shortenings wherein its emulsifying properties promote improved performance of the plastic shortening in the preparation of baked goods.

*Example II*

The process of Example I was repeated except that 54 parts of methyl palmitate was reacted with 18 parts of mannitol and that dimethylsulfoxide was utilized as the solvent reaction medium in the same amount as the dimethylacetamide solvent of Example I.

The ester product from this reaction was found to have a hydroxyl value of 247.4 and a total fatty acid content of 80.65%.

*Example III*

18 parts of sorbitol, 27 parts of methyl palmitate and about 200 parts of dimethylacetamide were introduced into a reaction vessel provided with mechanical stirring means. This mixture was heated to about 150° C. and then a suspension of about 9% sodium methoxide catalyst in xylene was added to the heated mixture in an amount equal to about 1% by weight of the methyl palmitate. The resulting mixture was reacted for one hour at 150° C. under a pressure of about 600 mm. of mercury. A reduced pressure was utilized so that a portion of the methanol, formed as a by-product of the reaction, could be continuously removed from the reaction mixture. After the one hour's reaction time the catalyst was inactivated by the addition of a 50% aqueous solution of acetic acid.

The reaction product was then taken up in a 1:4 mixture of butanol and ethyl acetate and was water-washed four times after which the butanol:ethyl acetate mixture was removed from the product by evaporation under vacuum. The resultant product was crystallized from about 20 parts of a 1:1 mixture of dioxane and ethyl ether at 10° C. and vacuum dried for 18 hours at 70 to 80° C.

The ester product was found, by analysis, to have a hydroxyl value of 564.4 and a total fatty acid content of about 65.8%. The analytically obtained hydroxyl value of 564.4 compares favorably with the calculated hydroxyl value of 575 for the product, indicating the substantially complete absence of anhydro groups in the product.

If desired, methyl laurate, propyl stearate, butyl oleate, hexyl palmitate, etc., can be substituted for methyl palmitate in the preceding example to give a straight-chain hexitol ester with substantially the same degree of esterification and freedom from anhydro groups.

*Example IV*

The process of Example III was repeated except that the reaction was conducted at a temperature of 125° C. and at a pressure of 195 mm. of mercury.

The ester product from this reaction was characterized by a hydroxyl value of 567.5 and a total fatty acid content of 66.1%. The analytically determined hydroxyl value of 567.5 compares favorably with a calculated value of 570 indicating the substantial absence of anhydro groups in the product.

*Example V*

The process of Example III was repeated except that 18 parts of mannitol was used in place of sorbitol as the hexitol reactant.

The ester product from this reaction had a hydroxyl value of 484.4 (this compares with a calculated hydroxyl value for this product of 482) and a total fatty acid content of 70.6%.

*Example VI*

The process of Example V was repeated except that dimethylsulfoxide was used as the solvent reaction medium and that the reaction was carried out at a pressure of 150 mm. of mercury.

The ester product from this reaction had a hydroxyl value of 509.7 and a total fatty acid content of 68.9%.

In the foregoing example, methyl ethyl sulfoxide, diethylsulfoxide, and dipropylsulfoxide can be substituted for dimethylsulfoxide as the solvent reaction medium if desired to give a hexitol-fatty ester of substantially the same degree of esterification and freedom from anhydro groups.

*Example VII*

The process of Example VI was repeated except that the reaction was conducted at a temperature of 100° C. and under a pressure of 30 mm. of mercury.

Upon analysis, the ester product was found to have a hydroxyl value of 475.3 (476 is the calculated hydroxyl value of the product) and a total fatty acid content of 70.8%.

*Example VIII*

36 parts of mannitol, 87.5 parts of a mixture of 80% soybean oil and 20% cottonseed oil hydrogenated to an iodine value of about 76, and about 360 parts of dimethylacetamide were introduced into a reaction vessel provided with mechanical stirring means. This mixture was heated to a temperature of 100° C. and then 1% of sodium methoxide catalyst by weight of the fatty material was added to the heated mixture. (The sodium methoxide was added as a 10% suspension in xylene.) The resulting mixture, while being agitated, was allowed to react for one hour under atmospheric pressure. The catalyst was then inactivated by the addition to the reacting mixture of a 50% aqueous solution of acetic acid. The resulting mixture was then treated in accordance with the procedures set forth in Example I to isolate the mannitol-fatty ester.

The ester product was found to have a hydroxyl value of 342.3 and a total fatty acid content of 77.39%.

In the foregoing example diethylacetamide, monobutyl acetamide, monoethyl acetamide, monomethyl butyramide, monomethylpropionamide and dimethyl butyramide can be substituted for dimethyl acetamide as the solvent reaction medium with the production of a hexitol-fatty ester of substantially the same degree of esterification and freedom from anhydro configurations.

Example IX

The process of Example VIII was repeated except that dimethylsulfoxide was used as the reaction medium.

The ester product of this reaction was found to have a hydroxyl value of 329.2 and a total fatty acid content of 78.67%.

Example X

The process of Example VIII was repeated except that sorbitol was utilized in place of mannitol as the hexitol reactant.

The ester product from this reaction was found to have a hydroxyl value of 378.8 and a total fatty acid content of 77.23%.

Example XI

The process of Example X was repeated utilizing dimethylsulfoxide as the solvent reaction medium.

The ester product of this reaction was found to have a hydroxyl value of 332.9 and a total fatty acid content of 78.74%.

In the foregoing examples the hydroxyl values (H.V.) and percent total fatty acids (T.F.A.) of the products were determined analytically in accordance with Official Method Cd 4-40 and Tenative Method G3-53 respectively of the Official and Tenative Methods of the American Oil Chemists Society.

Wherever set forth herein the calculated hydroxyl values of the sorbitol and mannitol fatty esters were obtained using the following equations:

(a) For sorbitol and mannitol palmitates—

$$H.V. = 1851 - \frac{1851}{95.4} \times T.F.A. \text{ (observed)}$$

where

1851=H.V. of sorbitol or mannitol and
95.4=T.F.A. of sorbitol or mannitol hexapalmitate ester (b) For ester products from the reaction of sorbitol or mannitol with the soybean oil-cottonseed oil admixture—

$$H.V. = -\frac{1851}{95.75} \times T.F.A. \text{ (observed)}$$

where

1851=H.V. of sorbitol or mannitol and
95.75=T.F.A. of sorbitol or mannitol completely esterified with the soybean oil-cottonseed oil admixture.

That the ester products produced in accordance with the process of this invention are substantially completely free from undesirable anhydro groups is evident from FIGURE 1. This figure contains a plot of hydroxyl value (H.V.) versus percent total fatty acid (T.F.A. and shows the linear relationship between these values. The three drawn curves of FIGURE 1 are based upon the following calculated values for sorbitol palmitates (sorbitol-fatty esters containing no anhydro groups), sorbintan palmitates (monoanhydrosorbitol-fatty esters) and sorbitide palmitates (dianhydrosorbitol-fatty esters).

| Compound | H.V. | T.F.A. |
|---|---|---|
| Sorbitol Monopalmitate | 668 | 61.0 |
| Sorbitol Dipalmitate | 342 | 77.8 |
| Sorbitol Hexapalmitate | 0 | 95.4 |
| Sorbitan Monopalmitate | 429 | 63.7 |
| Sorbitan Dipalmitate | 175 | 80.0 |
| Sorbitan Tetrapalmitate | 0 | 91.7 |
| Sorbitide Monopalmitate | 145 | 66.7 |
| Sorbitide Dipalmitate | 0 | 82.3 |

The hydroxyl values of the products of each of the specfic examples herein have been indicated in FIGURE I and have been numbered to conform with the respective examples.

In FIGURE I the curve delineated by the calculated values for the products obtained from the interesterification of sorbitol or mannitol with the soybean oil-cottonseed oil mixture has not been indicated. Based upon calculated points represented by an H.V. of 629 and T.F.A. of 63.2 for the monoester of sorbitol and the soybean oil-cottonseed oil mixture and an H.V. of 0 and a T.F.A. of 95.75 for the hexa-ester of sorbitol and the oil mixture and being a straight-line relationship, this curve was found to so closely approximate the sorbitol palmitate curve of FIGURE I that the latter curve was utilized as a comparison reference for the products of Examples VIII, IX, X and XI as well as those of Examples I to VII.

The excellent agreement between the analytically obtained values of the products of the examples and the curve representing the calculated values for anhydro-free sorbitol-fatty esters is readily apparent.

It is to be understood that in the foregoing examples the sorbitol and mannitol may be replaced with other straight-chain hexitols hereinbefore mentioned with comparable results. Similarly, other fatty esters of the character indicated hereinbefore may be substituted for the fatty ester reactants of the examples.

Having thus described the invention what is claimed is:

1. A process for preparing fatty esters of straight chain hexitols, which esters are substantially free from anhydro groups, comprising reacting a straight-chain hexitol with a fatty acid ester selected from the group consisting of fatty acid esters of aliphatic primary monohydroxy alcohols and completely and incompletely esterified fatty acid esters of polyhydric alcohols having from 2 to 6 hydroxyl groups, in the presence of an interesterification catalyst, at a temperature in the range from about 50° to about 150° C., and in the presence of a solvent selected from the group consisting of (1) sulfoxides of the general formula

where R and R' are alkyl groups having from 1 to 3 carbon atoms, and (2) amides of the general formula

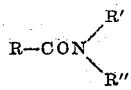

where R and R' are selected from the group consisting of hydrogen and an alkyl group having from 1 to 4 carbon atoms, and R" is an alkyl group having from 1 to 4 carbon atoms, the total number of carbon atoms in R, R' and R" being not greater than 7, the said aliphatic primary monohydroxy alcohols containing from 1 to about 8 carbon atoms in the presence of a sulfoxide solvent and from 1 to about 16 carbon atoms in the presence of an amide solvent, the said solvent being present in an amount at least sufficient to dissolve the straight-chain hexitol.

2. The process of claim 1 wherein the straight-chain hexitol is sorbitol.

3. The process of claim 1 wherein the straight-chain hexitol is mannitol.

4. The process of claim 1 wherein the straight-chain hexitol is dulcitol.

5. The process of claim 1 wherein the solvent is dimethylacetamide.

6. The process of claim 1 wherein the solvent is dimethylsulfoxide.

7. A process for preparing fatty esters of straight-chain hexitols, which esters are substantially free from anhydro groups, comprising reacting a straight-chain hexitol with a fatty acid ester selected from the group consisting of fatty acid esters of aliphatic primary monohydroxy alcohols and fatty acid esters of polyhydroxy alcohols, all of which alcohols have not more than three carbon atoms in the presence of an interesterification catalyst, at a temperature in the range from about 90° to about 150° C., and in the presence of a solvent selected from the group consisting of: (1) sulfoxides of the general formula

where R and R' are alkyl groups having from 1 to 3 carbon atoms; and (2) amides of the general formula

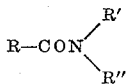

where R and R' are selected from the group consisting of hydrogen and an alkyl group having from 1 to 4 carbon atoms, and R" is an alkyl group having from 1 to 4 carbon atoms, the total number of carbon atoms in R, R' and R" being not greater than 7, the said solvent being present in an amount at least sufficient to dissolve the straight-chain hexitol.

8. The process of claim 7 wherein the straight-chain hexitol is sorbitol.

9. The process of claim 7 wherein the straight-chain hexitol is mannitol.

10. The process of claim 7 wherein the solvent is dimethylacetamide.

11. The process of claim 7 wherein the solvent is dimethylsulfoxide.

12. A process for preparing fatty esters of straight-chain hexitols, which esters are substantially free from anhydro groups, comprising reacting a straight-chain hexitol with a fatty acid ester of glycerol in the presence of from about 0.1% to about 2% of an interesterification catalyst by weight of the glycerol ester at a temperature in the range from about 90° to 150° C. and in a reaction medium comprising essentially a solvent selected from the group consisting of (1) sulfoxides of the general formula

where R and R' are alkyl groups having from 1 to 3 carbon atoms; and (2) amides of the general formula

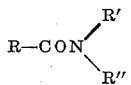

where R and R' are selected from the group consisting of hydrogen and an alkyl group having from 1 to 4 carbon atoms, and R" is an alkyl group having from 1 to 4 carbon atoms, the total number of carbon atoms in R, R' and R" being not greater than 7.

13. The process of claim 12 wherein the fatty acid ester is a triglyceride.

14. The process of claim 13 wherein the straight-chain hexitol is sorbitol.

15. The process of claim 13 wherein the straight-chain hexitol is mannitol.

16. The process for preparing fatty esters of straight-chain hexitols, which esters are substantially free from anhydro groups, which comprises reacting a straight-chain hexitol with a fatty acid ester of methanol in a reaction medium comprising essentially a solvent selected from the group consisting of (1) sulfoxides of the general formula

where R and R' are alkyl groups having from 1 to 3 carbon atoms; and (2) amides of the general formula

where R and R' are selected from the group consisting of hydrogen and an alkyl group having from 1 to 4 carbon atoms, and R" is an alkyl group having from 1 to 4 carbon atoms, the total number of carbon atoms in R, R' and R" being not greater than 7, in the presence of from about 0.1 to about 2% of an interesterification catalyst, by weight of the methyl ester, at a temperature in the range from about 90° to 150° C. and at a sufficiently low pressure that the methanol liberated during the reaction is continuously distilled from the reaction mix, whereby the reaction proceeds to substantial completeness.

17. The process for preparing fatty esters of straight-chain hexitols, which esters are substantially free from anhydro groups, comprising reacting a straight-chain hexitol and a fatty triglyceride, in the presence of an interesterification catalyst, at a temperature of about 100° C., in a reaction medium comprising essentially dimethylacetamide, inactivating the catalyst by acidulation, distilling substantially all of the dimethylacetamide from the reaction mixture, taking up the residue in a solvent and water-washing the resultant solution, removing the solvent by evaporation under vacuum and purifying the ester product.

18. The process for preparing fatty esters of straight-chain hexitols, which esters are substantially free from anhydro groups, comprising reacting a straight-chain hexitol and a fatty triglyceride, in the presence of an interesterification catalyst, at a temperature of about 100° C., in a reaction medium comprising essentially dimethylsulfoxide, inactivating the catalyst by acidulation, distilling substantially all of the dimethylsulfoxide from the reaction mixture, taking up the residue in a solvent and water-washing the resultant solution,, removing the solvent by evaporation under vacuum and purifying the ester product.

References Cited in the file of this patent

UNITED STATES PATENTS

| | | |
|---|---|---|
| 2,223,558 | Epstein | Dec. 3, 1940 |
| 2,357,077 | Brown | Aug. 29, 1944 |
| 2,357,078 | Brown | Aug. 29, 1944 |
| 2,812,324 | Huber et al. | Nov. 5, 1957 |
| 2,831,854 | Tucker et al. | Apr. 22, 1958 |
| 2,893,990 | Hass et al. | July 7, 1959 |